US008208897B2

(12) United States Patent
Kaneko et al.

(10) Patent No.: US 8,208,897 B2
(45) Date of Patent: Jun. 26, 2012

(54) PORTABLE WIRELESS TERMINAL AND ITS SECURITY SYSTEM

(75) Inventors: Takashi Kaneko, Kawasaki (JP); Tadaaki Tanaka, Kawasaki (JP); Masaaki Nagasaka, Kawasaki (JP); Keita Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1013 days.

(21) Appl. No.: 11/798,711

(22) Filed: May 16, 2007

(65) Prior Publication Data
US 2007/0281664 A1 Dec. 6, 2007

Related U.S. Application Data

(63) Continuation of application No. PCT/JP2004/017091, filed on Nov. 17, 2004.

(51) Int. Cl.
*H04M 1/66* (2006.01)
(52) U.S. Cl. ........ 455/410; 455/411; 455/418; 455/419; 455/420; 379/136
(58) Field of Classification Search .......... 713/150–158; 455/410–411, 418–420; 379/136
See application file for complete search history.

(56) References Cited

U.S. PATENT DOCUMENTS 5,748,084 A * 5/1998 Isikoff ........................ 340/568.1
6,480,096 B1 * 11/2002 Gutman et al. .............. 340/5.31
6,636,983 B1 * 10/2003 Levi ................................ 714/4
6,643,781 B1 * 11/2003 Merriam ......................... 726/35
6,704,768 B1 * 3/2004 Zombek et al. ............... 709/201
6,813,498 B1 * 11/2004 Durga et al. ............... 455/456.1
6,901,429 B2 * 5/2005 Dowling ....................... 709/203
(Continued)

FOREIGN PATENT DOCUMENTS
JP 7-193865 7/1995
(Continued)

OTHER PUBLICATIONS
Japanese Patent Office Notice of Reasons for Rejection issued in Japanese Patent Application No. 2006-544730 (dated Jun. 16, 2009).

*Primary Examiner* — Jean Gelin
*Assistant Examiner* — Nathan Taylor
(74) *Attorney, Agent, or Firm* — Murphy & King, P.C.

(57) ABSTRACT

The present invention relates to a portable wireless terminal, and in particular, a portable wireless terminal such as a cellular phone, etc., and its security system that can reliably prevent, by remote control, improper use of the portable wireless terminal by a third party when it is lost or stolen.
The portable wireless terminal that uploads backup data to a center by remote control from the center via a wireless network includes: a data access control section 1-1 that, in response to an instructions from the center, prohibits access to the backup data retained by a portable wireless terminal or deletes the backup data; an encryption section 1-5 that encrypts the backup data by using a public key notified from the center or a public key owned by the portable wireless terminal itself in response to instructions from the center; and a data transmission section 1-2 to 1-4 that transmits the backup data split into a plurality of data fragments on a plurality of communication paths to the center according to transmission priority of the backup data that is notified from the center or owned by the portable wireless terminal itself.

12 Claims, 8 Drawing Sheets

U.S. PATENT DOCUMENTS

| | | | |
|---|---|---|---|
| 6,950,939 B2 * | 9/2005 | Tobin | 713/182 |
| 6,999,777 B1 * | 2/2006 | Ganesh | 455/456.1 |
| 7,003,571 B1 * | 2/2006 | Zombek et al. | 709/227 |
| 7,047,426 B1 * | 5/2006 | Andrews et al. | 713/155 |
| 7,158,803 B1 * | 1/2007 | Elliott | 455/512 |
| 7,200,220 B1 * | 4/2007 | Yamao | 379/350 |
| 7,353,533 B2 * | 4/2008 | Wright et al. | 726/1 |
| 7,526,275 B2 * | 4/2009 | Kokubo | 455/411 |
| 2002/0075844 A1 * | 6/2002 | Hagen | 370/351 |
| 2003/0140158 A1 * | 7/2003 | Lee et al. | 709/231 |
| 2004/0117636 A1 * | 6/2004 | Cheng | 713/185 |
| 2004/0137893 A1 * | 7/2004 | Muthuswamy et al. | 455/419 |
| 2004/0261093 A1 * | 12/2004 | Rebaud et al. | 725/25 |
| 2005/0021571 A1 * | 1/2005 | East | 707/201 |
| 2005/0044404 A1 * | 2/2005 | Bhansali et al. | 713/200 |
| 2005/0186989 A1 * | 8/2005 | Cocita | 455/558 |
| 2005/0283656 A1 * | 12/2005 | Baumert et al. | 714/8 |
| 2006/0010199 A1 * | 1/2006 | Brailean et al. | 709/204 |
| 2006/0184667 A1 * | 8/2006 | Clubb et al. | 709/224 |
| 2007/0021141 A1 * | 1/2007 | Yokota et al. | 455/550.1 |

FOREIGN PATENT DOCUMENTS

| | | |
|---|---|---|
| JP | 07193865 A | 7/1995 |
| JP | 10-290193 | 10/1998 |
| JP | 2000-270376 | 9/2000 |
| JP | 2000270376 | 9/2000 |
| JP | 2000270376 A | 9/2000 |
| JP | 2002-51377 | 2/2002 |
| JP | 2002051377 A | 2/2002 |
| JP | 2003-132291 | 5/2003 |
| JP | 2003-319453 | 11/2003 |
| JP | 2003319453 A | 11/2003 |
| JP | 2004-32402 | 1/2004 |
| JP | 20044032402 A | 1/2004 |
| JP | 2004-40457 | 2/2004 |
| JP | 2004040457 | 2/2004 |
| JP | 2004-112478 | 4/2004 |
| JP | 2004-228659 | 8/2004 |
| JP | 2004-274310 | 9/2004 |
| JP | 2004-304716 | 10/2004 |
| JP | 2005-39587 | 2/2005 |

* cited by examiner

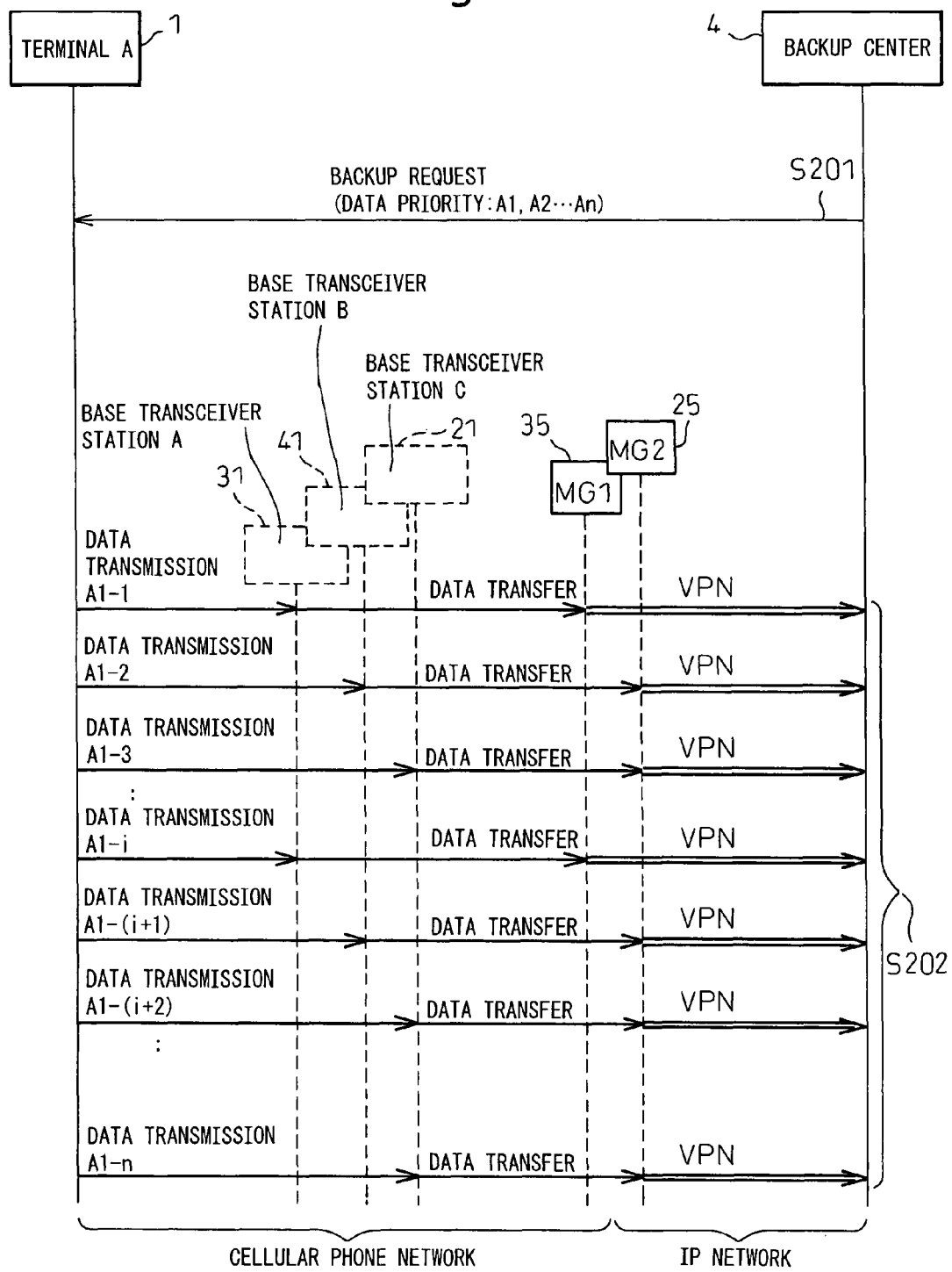

PORTABLE WIRELESS TERMINAL AND ITS SECURITY SYSTEM

CROSS-REFERENCE TO RELATED APPLICATION

This application is a continuation application and is based upon PCT/JP2004/17091, filed on Nov. 17, 2004.

TECHNICAL FIELD

The present invention relates to a portable wireless terminal, and in particular, to a portable wireless terminal, such as a cellular phone, etc., and its security system that can prevent, by remote control, improper use of the portable wireless terminal by a third party when it is lost or stolen.

BACKGROUND ART

In recent years, a portable wireless terminal such as a cellular phone, a wireless LAN terminal, etc., is rapidly becoming widespread. In particular, as cellular phone become smaller and lighter due to technological advances, it is common to carry a cellular phone all of the time in daily life. In addition to a conventional voice call function, the cellular phone is gaining greater functionality such as a personal information terminal that stores and manages data of various kinds, such as individual-based confidential information, etc.

As a result, users who have lost their cellular phones through carelessness, theft or for other reasons suffer from problems in that tolls are often improperly charged to authorized terminal owners or confidential data (for example, a phonebook, an email address book, schedule information, an electronic purse, etc.) is used improperly. Therefore, there is a need for a means in order to prevents improper use of lost or stolen cellular phones.

As one security function for cellular phones, a dial-lock function by means of a personal identification number is conventionally used to prevent a calling operation by a third party who does not know the personal identification number. The owner of the lost or stolen terminal usually informs a central exchange office, etc., of the loss or theft so that the central exchange office can stop calls to/from the terminal.

Further, there is disclosed a technique in which the owner of the lost or stolen terminal makes a call to the terminal in question from an ordinary telephone so that stored data in the terminal is deleted in order to prevent reading of the stored data by remote control. (See Patent Document 1.) Still further, there is disclosed a technique in which stored data of the lost or stolen terminal is uploaded to a service center by remote control, backed up, and after the terminal has been found, saved data is downloaded from the service center in order to restore the terminal to its original state. (See Patent Document 2.)

[Patent Document 1]
Japanese Unexamined Patent Publication H07-193865
[Patent Document 2]
Japanese Unexamined Patent Publication 2000-270376

DISCLOSURE OF THE INVENTION

Problems to be Solved by the Invention

However, in the case of a dial-lock function using a personal identification number, there is a problem in that memory can be removed from the terminal and the contents of the memory can be read directly. Even though the service center can stop calls to/from the lost or stolen terminal to solve the problem of the improperly charged tolls by a third party, there still remains the problem described above.

Further, when the retained data is deleted or prevented from being read by remote control, a complicated operation is required to restore the terminal. Even if the complicated operation can be avoided by using the retained data of the terminal that is uploaded to the backup memory of the service center, the transmitted data to be saved may be intercepted by a third party. Still further, even if a password, etc. is used, the third party may steal it and manipulate the data and so on.

Therefore, it is an object of the present invention to provide a portable wireless terminal and a security system including the same that can solve the various problems described above and further improve security.

Means for Solving the Problems

According to the present invention, there is provided a security system for a portable wireless terminal that is comprised of: a wireless network; a portable wireless terminal; and a service center that remotely controls the portable wireless terminal and stores backup data uploaded from the portable wireless terminal, wherein the center comprises a table containing identification information of communication terminals owned by group members of the portable wireless terminal, authenticates one of the group members accessing the network by using a communication terminal matching the identification information in the table with the wireless terminal, and in response to a request from the authenticated group member, performs a backup process of data stored in the portable wireless terminal of the group member.

The table further contains transmission priority information of uploaded data, the center notifies the portable wireless terminal of the transmission priority information in the backup process, and according to the notified transmission priority information, the portable wireless terminal transmits the backup data to the center. The portable wireless terminal splits the backup data to be transmitted to the center into a plurality of data fragments and transmits the backup data to the center in the form of split data fragments that are transmitted cyclically in a distributed manner on a plurality of available communication paths.

The center notifies the portable wireless terminal of a public key, and in place of or along with the backup process, the portable wireless terminal encrypts the stored data using the public key.

Further, according to the present invention, there is provided a backup center that remotely controls a portable wireless terminal via a wireless network and stores backup data uploaded from the portable wireless terminal, the backup center is comprised of: a table that contains identification information of communication terminals owned by group members of the portable wireless terminal and transmission priority information of the uploaded data; an authentication section that authenticates one of the group members accessing by using the communication terminals based on a match with the identification information in the table; and a backup processing section that, in response to a request from the group member authenticated successfully, performs a backup process of data retained by the portable wireless terminal of the group member.

The backup center further includes a data assembly section that, in the backup process, when the backup data based on the transmission priority information is further split into data fragments and transmitted on a plurality of communication paths, assembles the split data fragments and restores the original backup data.

Still further, according to the present invention, there is provided a portable wireless terminal that uploads backup data to a service center by remote control from the service center via a wireless network, the portable wireless terminal having: a data access control section that, in response to an instruction from the center, prohibits access to the backup data retained by the portable wireless terminal or deletes the backup data; and an encryption section that encrypts the backup data by using a public key notified from the center or a public key owned by the portable wireless terminal in response to instructions from the center.

The portable wireless terminal further includes a data transmission section that transmits the backup data to the service center according to transmission priority of the backup data that is notified from the center or owned by the portable wireless terminal, wherein the data transmission section splits the backup data to be transmitted to the center into a plurality of data fragments and transmits the split data fragments to the center cyclically in a distributed manner on a plurality of communication paths available. The portable wireless terminal further includes; an encryption section that implements the communication paths as a VPN; and a wake-up section that performs a wake-up process periodically at a predetermined time.

Effects of the Invention

According to the present invention, when a portable wireless terminal such as a cellular phone, etc., is lost or stolen, it is possible to prevent interception of individual-based confidential information, such as phonebook data, email addresses, emails, images, an electronic purse, card data, etc., that is stored data of the portable wireless terminal and to safely remove the retained data from the portable wireless terminal by remote control. Therefore, only the authorized terminal owner can transfer stored data to the portable wireless terminal that is later returned or a newly purchased portable wireless terminal. Further, due to physical limitation, remote control can only be performed through the terminal that is registered in a predetermined manner, and therefore, improper use by a third party using a stolen password, etc., can be prevented.

Further, according to the present invention, the data in the lost or stolen portable wireless terminal is encrypted using a public key by remote control and can only be decrypted by using a secret key owned by the authorized terminal owner. Therefore, security of the terminal can be ensured without deleting or backing up stored data. In this case, the authorized terminal owner can easily restore stored data by using his/her own secret key.

Still further, according to the present invention, the lost or stolen portable wireless terminal performs a wake-up process periodically at predetermined time periods, and therefore, the remote control described above can be reliably performed on the terminal that is located in a radio wave coverage in the time period. Therefore, by appropriately combining the security functions of the present invention described above with the conventional dial-lock function, etc., important information can be reliably protected against a third party, and as a result, it is possible to provide the portable wireless terminal and security system with improved security functions.

BRIEF DESCRIPTION OF THE DRAWINGS

FIG. 7 is a diagram showing an example of a communication sequence using split communication paths.

BEST MODE FOR CARRYING OUT THE INVENTION

Figure 1:
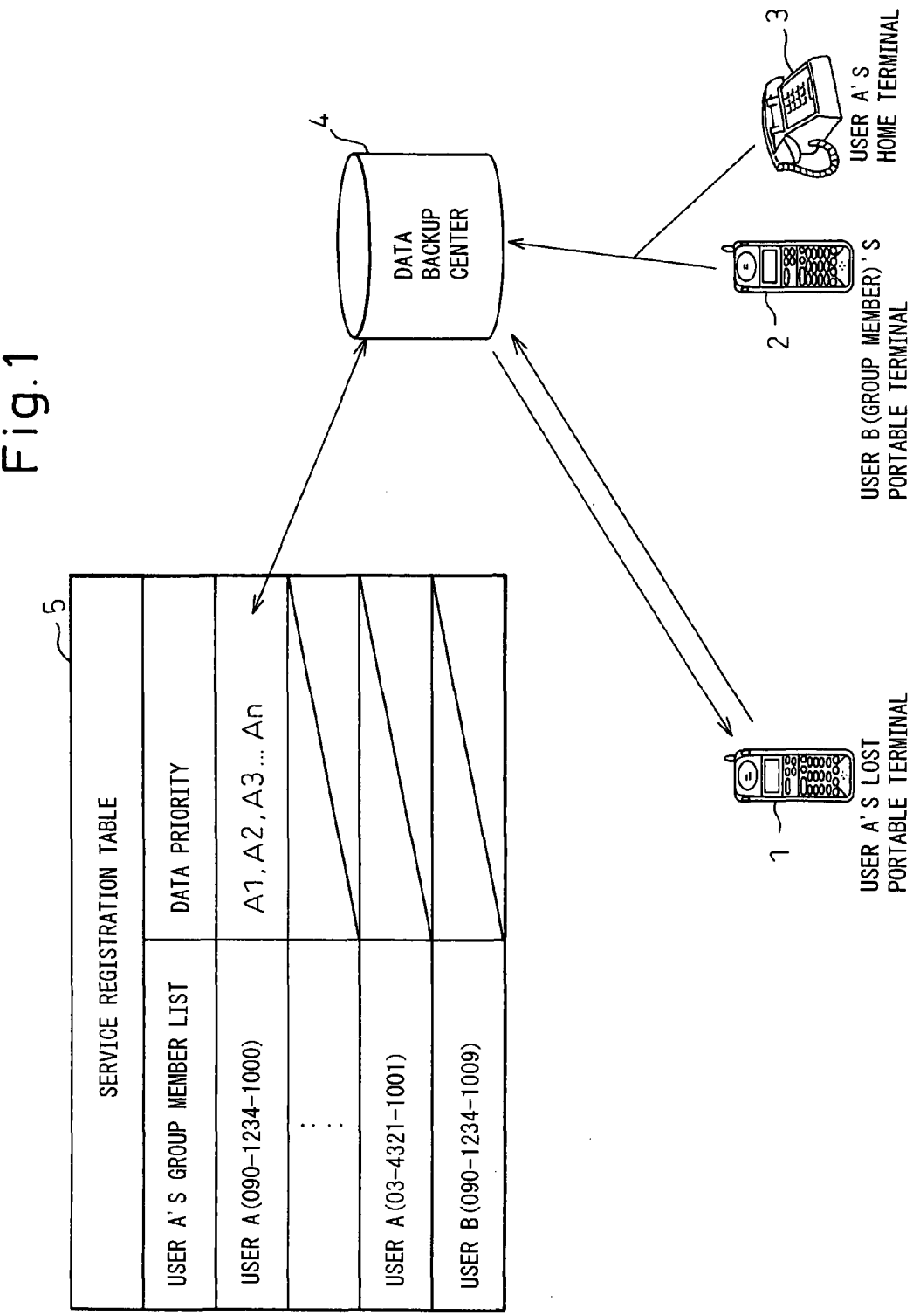
FIG. 1 is a diagram showing an example of a security system according to the present invention.

FIG. 1 is a diagram showing an example of a security system according to the present invention.

The security system of FIG. 1 is provided with a data backup center 4 that comprises, a service registration table 5. Providing against loss of a portable wireless terminal (a cellular phone 1) for any reason, user A registers communication terminals that can access the data backup center 4 (in this example, user A's home phone 3 and user B's cellular phone 2) with the data backup center 4 in advance at the time of subscription to this service, etc.

User A's group member list (a list of phone numbers of the terminals that can issue a backup request) and data priority are stored in the service registration table 5 shown in the figure. User A's cellular phone 1 (phone number 090-1234-1000), User A's home phone 3 (phone number 03-4321-1000) and user B's cellular phone 2 (phone number 090-1234-1009) are registered in the group member list. Here, user B is a reliable person for user A, such as a family member, good friend, etc.

The home phone can be used only by people such as family members, and the user of the cellular phone can be identified by a terminal ID. Therefore, security can be improved compared with conventional basic authentication using a password. Here, basic authentication may be used in combination.

Further, in this example, in the data priority field, backup data items of user A's cellular phone 1 are arranged in order of priority. The cellular phone has to complete transmission of data while battery power remains. Therefore, in this example, priorities are assigned to each data item so that more important data items can be transmitted to the backup center 4 earlier. Here, the data items are transmitted sequentially from data item $A_1$ having the highest priority, to data item $A_n$ having the lowest priority.

Briefly describing operation of this security system, user A, who has lost his/her cellular phone 1, accesses the data backup center 4, for example, by borrowing user B's cellular phone 2. The data backup center 4 refers to the service registration table 5 and authorizes access from the cellular phone 2 that is user A's group member. User A obtains access authorization and requests backup of the cellular phone 1 and the data backup center 4 starts the requested backup process of the cellular phone 1.

The data backup center 4 first makes a call to user A's cellular phone 1 without ringing, and then, allows the stored data (backup data) of the cellular phone 1 to be uploaded by remote control via a wireless network. The data backup center 4 saves the backup data received from the cellular phone 1 in a storage device in the center. In the present invention, various security processes are performed during the period after the group member accesses the data backup center 4 until the data backup center 4 saves the data as described above. Hereinafter, these security processes will be described in detail.

Figure 2:
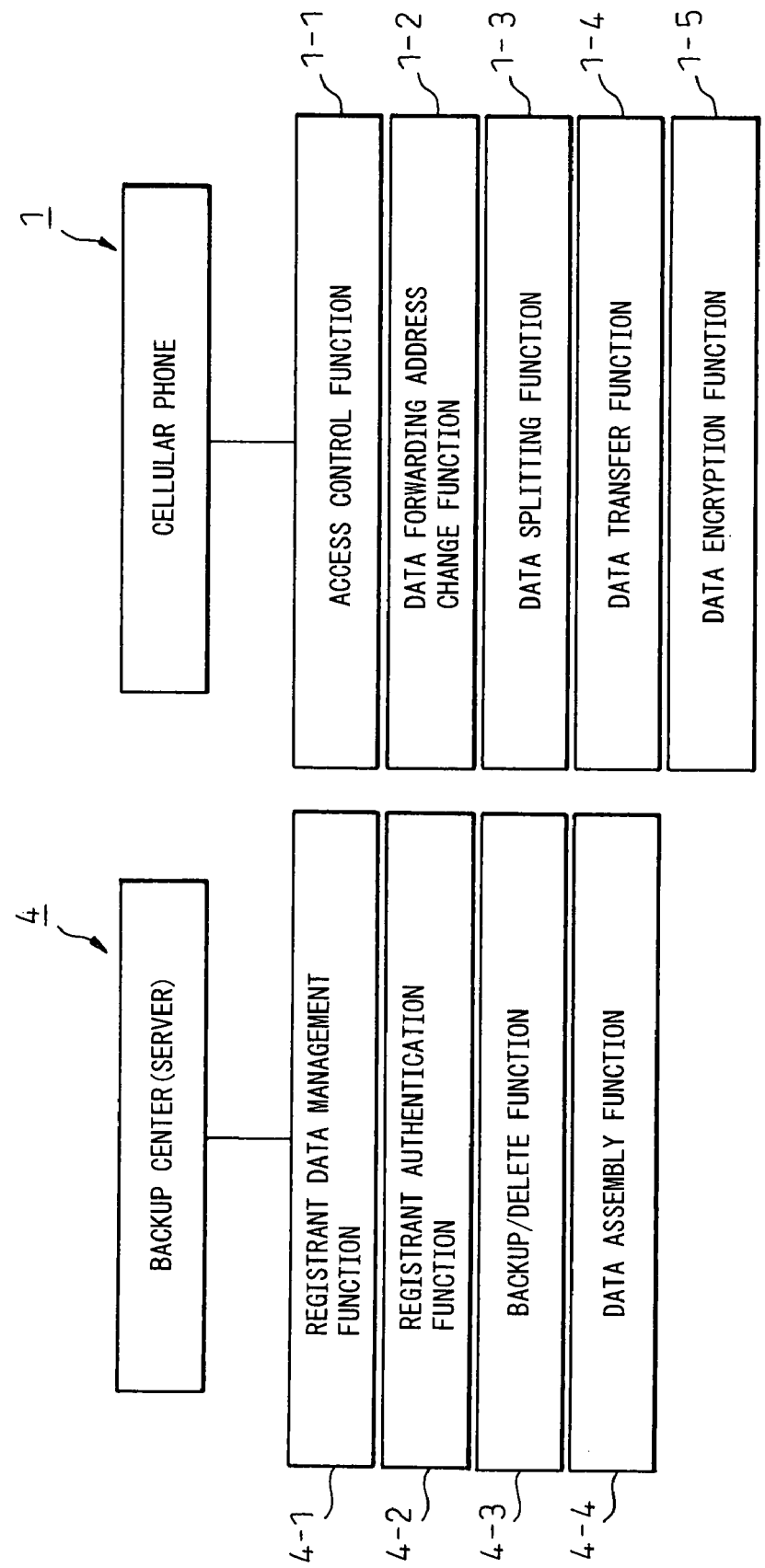
FIG. 2 is a diagram showing an exemplary block configuration of a backup center and a portable wireless terminal according to the present invention.

FIG. 2 shows a basic configuration of the backup center (backup server) and the portable wireless terminal (cellular phone) in the present invention. Here, it is to be noted that FIG. 2 shows only the configuration blocks that characterize the present invention and common components such as server function, voice call function, etc. are omitted.

First, the basic configuration of the backup center 4 will be described.

When a user subscribes to this security service, an operator, etc. writes necessary items (the group members and the data priority of FIG. 1, and so on) via a registrant data management function 4-1. After that, the registered user can access the backup center (backup server) 4 directly to update, delete and so on the contents of the service registration table via this function 4-1.

A registrant authentication function 4-2 authenticates a person who accesses the center by determining whether the person is a registered group member or not with reference to the service registration table 5. Here, basic authentication may be used in combination with this function 4-2.

After the registrant authentication process is completed, a backup/delete function 4-3 obtains the phone number of the cellular phone 1 that is requested to be backed up from the service registration table 5 and makes a call to the phone number without ringing. After making the call, with reference to the service registration table 5, this function 4-3 requests to transmit the registered data items in priority order according to the registered priorities of the data items. Further, after backup is completed, this function 4-3 deletes the retained data in the cellular phone 1, if necessary. Still further, this function 4-3 is notified of a dial-lock mode and transmits a public key to the cellular phone 1 to encrypt its stored data.

When the stored data of the lost cellular phone 1 is fragmented into data fragments and transmitted via a plurality of communication paths, a data assembly function 4-4 assembles the received data fragments to restore the original data. Further, when the data fragments are transmitted via one communication path in random order, this function 4-4 also assembles the received data fragments to restore the original data.

Next, a basic configuration of the cellular phone 1 will be described.

According to requests from the backup center 4, an access control function 1-1 performs access control to the terminal or to the backup center 4. As the access control to the terminal, this function 1-1 performs the dial-lock function and a wake-up process that automatically turns on the power of the terminal periodically (for example, 5 minutes from 12:00 a.m. every day). On the contrary as the access control to the backup center 4, in addition to usual communication control with the backup center 4, this function 1-1 performs the following processes i)-v) in cooperation with functions 1-2 to 4-5 described below:

i) a process to transmit the backup data sequentially according to the data priority that is notified from the backup center 4 or stored in the terminal itself in advance;

ii) in relation to the process i) described above, a process to transmit the backup data via a plurality of communication paths in a split manner;

iii) in relation to the processes i)-ii) described above, a process to encrypt and transmit backup data and, further, to use VPN (virtual private networks) as the communication paths for the backup data;

iv) after the processes i)-iii) described above are completed, a process to delete the retained data in response to the delete request from the backup center 4 or independently; and V) in place of or along with the backup processes i)-iii) described above, a process to encrypt the retained data in the terminal by a public key notified from the backup center 4 or owned by the terminal. In this case, a secret key for decrypting the encrypted retained data is owned by the authorized terminal owner (user A) since it is sent by mail from the backup center 4 or notified when the authorized terminal owner subscribes to this security service.

In the process ii) described above, when the backup data is transmitted to the plurality of communication paths, a data forwarding address change function 1-2 switches between the communication paths. More specifically, this function 1-2 sequentially switches between a plurality of base transceiver stations that can communicate with a point where the cellular phone 1 exists at present. For that purpose, a hand over process, which is typically performed when the cellular phone 1 moves, is employed. In this case, the hand over process specific to the present invention to cyclically switch between the communicatable base transceiver stations is performed with priority over the typical hand over process.

When the data forwarding address change function 1-2 described above transmits the backup data to the plurality of communication paths, a data splitting function 1-3 further fragments the backup data into data fragments transmitted to each transmission path so that data having identical content is distributed to the plurality of communication paths.

A data transfer function 1-4 sequentially transmits the backup data fragments that are fragmented by the data splitting function 1-3 described above to each base transceiver station switched by the data forwarding address change function 1-2. Alternatively, this function 1-4 may randomize the transmission order of the data fragments and sequentially transmit it to an identical communication path.

In order to further improve the security of the transmitted data, a data encryption function 1-4 performs the processes iii) and v) described above. When the backup center 4 is located on the Internet as a public service network, this function creates a plurality of VPN routes using IPsec-VPN (IP security-VPN) that is a standard protocol for encrypted communication, SSL-VPN (secure sockets layer-VPN) that provides a high security level without need of VPN devices or client-specific software, etc., so as to ensure security.

Further, upon receipt of the public key using RSA or the like from the backup center 4, or in response to the requirement for encryption from the backup center 4, this function encrypts the stored data in the cellular phone 1 by using the received public key or the public key owned by the terminal.

Figure 3:
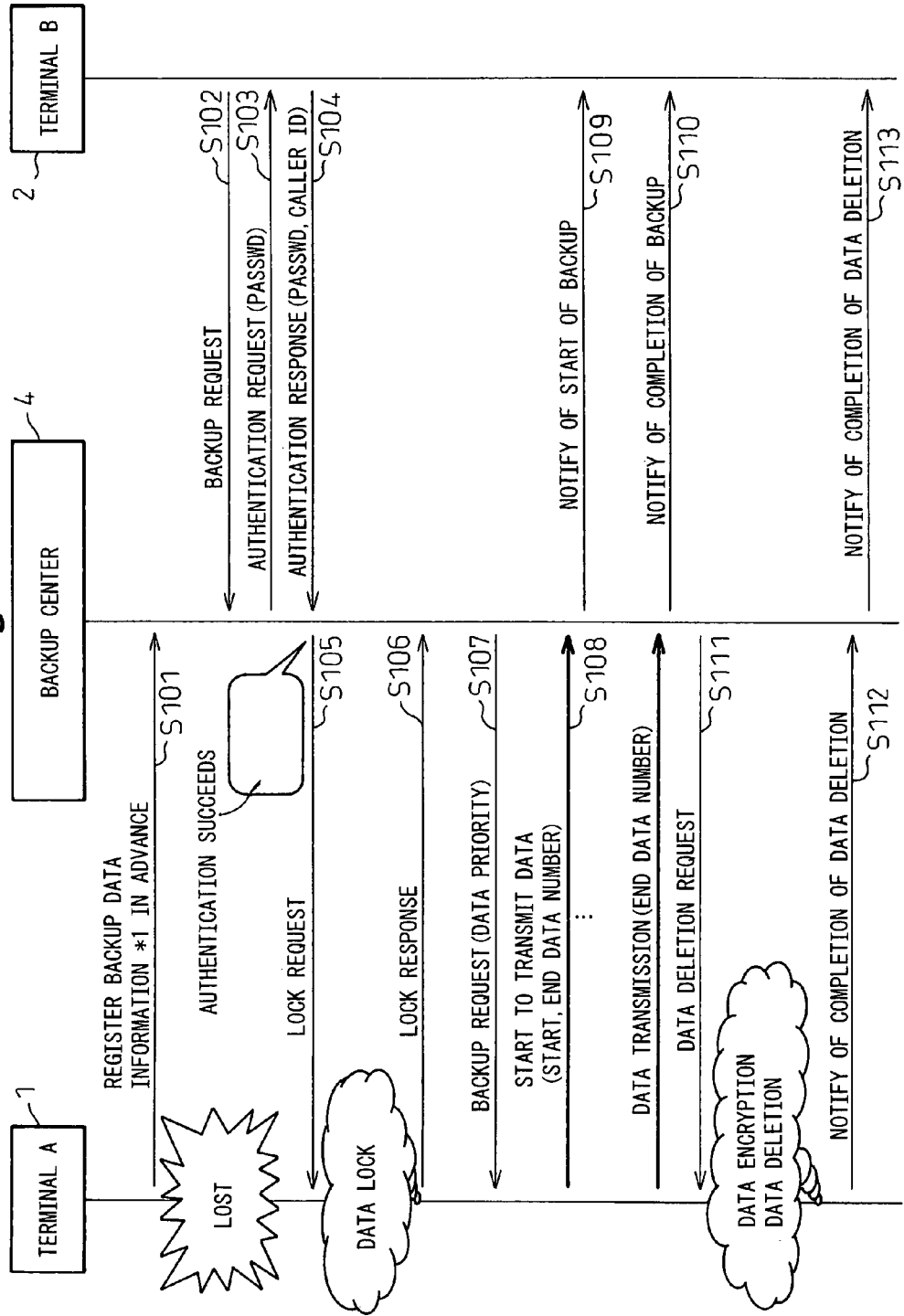
FIG. 3 is a diagram showing a first embodiment of the present invention.
Figure 4:
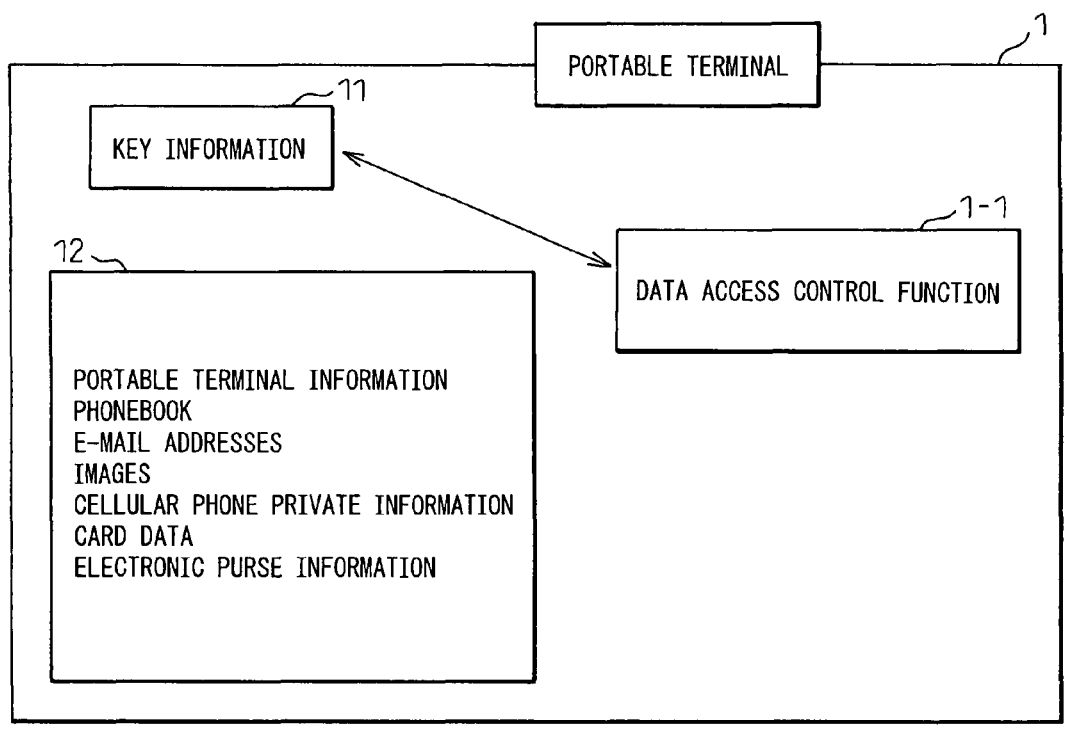
FIG. 4 is a diagram schematically showing an example of user authentication when backup is requested.

FIG. 3 shows a first embodiment of the present invention. FIG. 4 schematically shows an example of user authentication when backup is required.

In this example, user A registers his/her cellular phone with the backup center 4 by using the registrant data management function 4-1 of the backup center 4 in advance. According to the service registration table 5 of FIG. 1, the cellular phone 1 (TEL: 090-1234-1000) of user A and the backup priority of its data (A1, A2, A3, . . . , An), the cellular phone 2 (TEL: 090-1234-1009) of user B who is one of user A's group members, and so on are registered (S101).

After that, if user A's cellular phone 1 is lost, user A requests the backup center 4 to backup the retained data of the cellular phone 1 by borrowing user B's registered cellular phone 2 (S102). In response to this request, the registrant authentication function 4-2 in the backup center 4 refers to the service registration table 5 and, based on the physical authentication of the phone number of user B's cellular phone 2, it's terminal ID and so on, determines that this request comes from one of user A's group members. In this example, basic authentication is performed further by using user A's password (S103) and user A's password is input from user B's cellular phone 2 (S104). If the caller ID (phone number) of the cellular phone 2 and the input passwords match, the backup center 4 determines that authentication has succeeded.

After user authentication succeeds, the backup/delete control function 4-3 of the backup center 4 makes a call to user A's cellular phone 1 without calling by using the phone number of the cellular phone 1 detected from the service registration table 5, and in this example, first issues a lock request (S105). It prevents, at an early stage, charges, theft of the terminal data, etc., resulting when a third party makes/ receives calls.

FIG. 4 schematically shows an example of the access control function 1-1 of the cellular phone 1.

The data access into the cellular phone 1 is performed by activating the access control function 1-1 on an application, and at this time, the access control function 1-1 refers to key information 11. In this example, the access control function 1-1 copies the key information included in the lock request to a key information memory 11.

Then, access control to the retained data 12 in the terminal is performed according to the key information. As an example, key information comprised of 2 bits is assigned as: [1,1]-full access permission to the retained data 12 (a default set value); [0,1]-dial-lock function is turned on; [1,0]-encryption of the stored data 12; and [0,0]-prohibition of access to the stored data 12 (or deletion of the retained data), etc. In the example of FIG. 3, key information [0,1] is received.

Returning to FIG. 3, the cellular phone 1 that receives the lock request turns on the dial-lock function, and then, transmits a lock response (S106). Receiving this response, the backup/delete control function 4-3 of the backup center 4 refers to the service registration table 5 and transmits the registered data priority to the cellular phone 1 (S107). The cellular phone 1 transmits the retained data 12 in the order of A1, A2, A3, . . . according to the received data priority. Notification of the start of data transmission is accompanied with a data number and an end data number and each data item with these numbers is sequentially transmitted to the backup center 4 (S108).

In this data transmission, the data forwarding address change function 1-2, the data splitting function 1-3, the data transfer function 1-4 and the data encryption function 1-5 described above are used. (See FIGS. 4-7 hereinafter.) As a result of these functions, important data items can be backed up with priority while battery power of the terminal remains and data security can be ensured at a high level.

After determining that the backup data has been received completely, the backup/delete control function 4-3 transmits a notification of backup completion to user B's cellular phone 2 (S110). In this example, the backup/delete control function 4-3 further transmits a data delete request to the lost cellular phone 1 (S111), wherein the key information [0,0] described above can be used for this request. In response to this request, the cellular phone 1 deletes the retained data 12 completely, and then, transmits a notification of completion of data deletion to the backup center 4 (S112). The backup center 4 transmits the notification of completion of data deletion to the cellular phone 2 to terminate the backup process of this embodiment (S113).

Figure 5A:
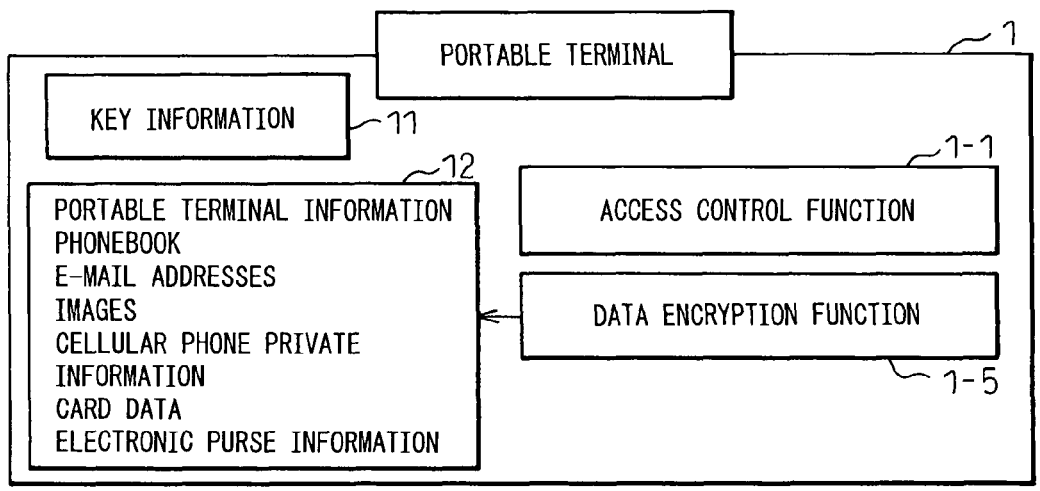
FIG. 5A is a diagram showing a second embodiment (1) of the present invention.
Figure 5B:
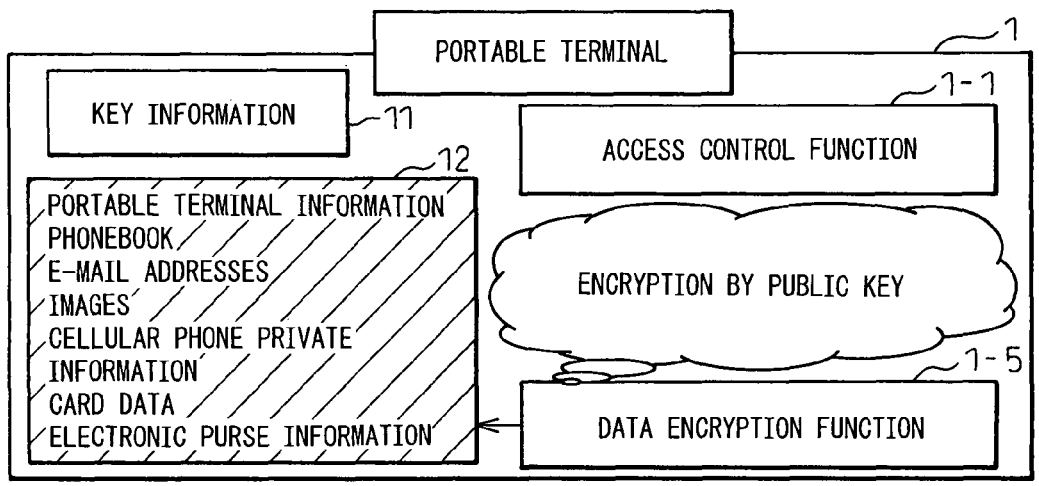
FIG. 5B is a diagram showing a second embodiment (2) of the present invention.
Figure 5C:
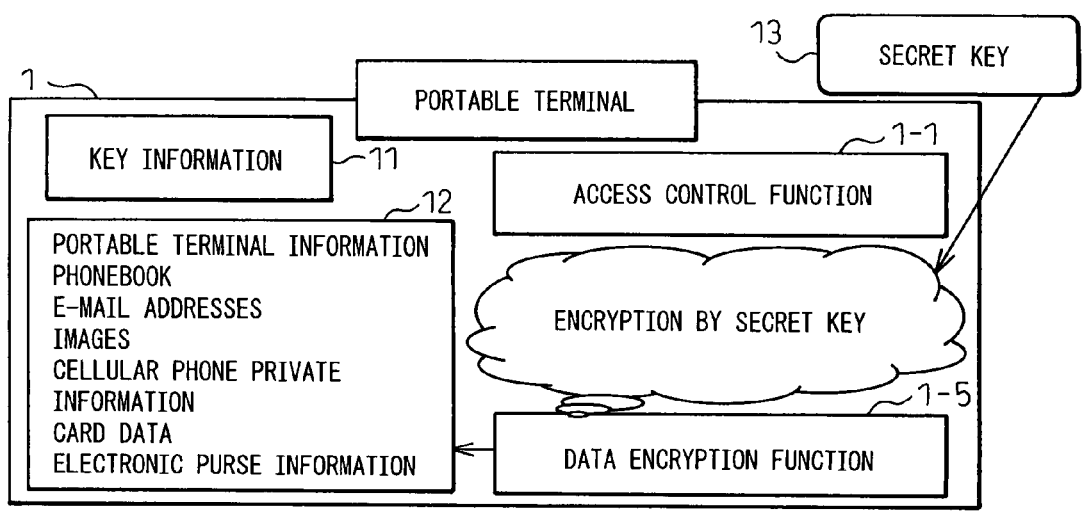
FIG. 5C is a diagram showing a second embodiment (3) of the present invention.

FIGS. 5A-5C show a second embodiment of the present invention.

Here, in place of or along with the backup process of FIG. 3, there is schematically shown an example of encryption of stored data 12 of the cellular phone 1. In the context of the sequence shown in FIG. 3, the lock request (S105) or the data delete request (S111) is replaced with an encryption request in this example.

As shown in FIG. 5A, also in this example, the same key information as that of FIG. 4 is used, and thus, when the access control function 1-1 detects that the 2-bit value [1,0] (encryption of the retained data 12) is copied to the key information memory 11, the data encryption function 1-5 starts to encrypt the retained data 12 by using the public key (FIG. 5B). This public key may either be included in the message of the encryption request received from the backup center 4 or owned by the data encryption function 1-5.

In FIG. 5C, user A, who is the authorized owner of the lost cellular phone 1, decrypts the retained data 12 in the cellular phone 1 when it is returned by using the secret key 13 that is obtained when user A subscribed to this security service or sent by mail from the backup center 4 that transmits the encryption request. In the case of this example, only user A who owns the secret key 13 can decrypt the retained data 12 that is strongly encrypted by the public key system, and therefore, sufficient security can be ensured against use by a third party. Further, in this example, the backup of the retained data 12 itself can be made unnecessary, and moreover, the process for transmitting the backup data is not necessary, and therefore, the influence of the remaining power of the terminal power source can be reduced.

Figure 6:
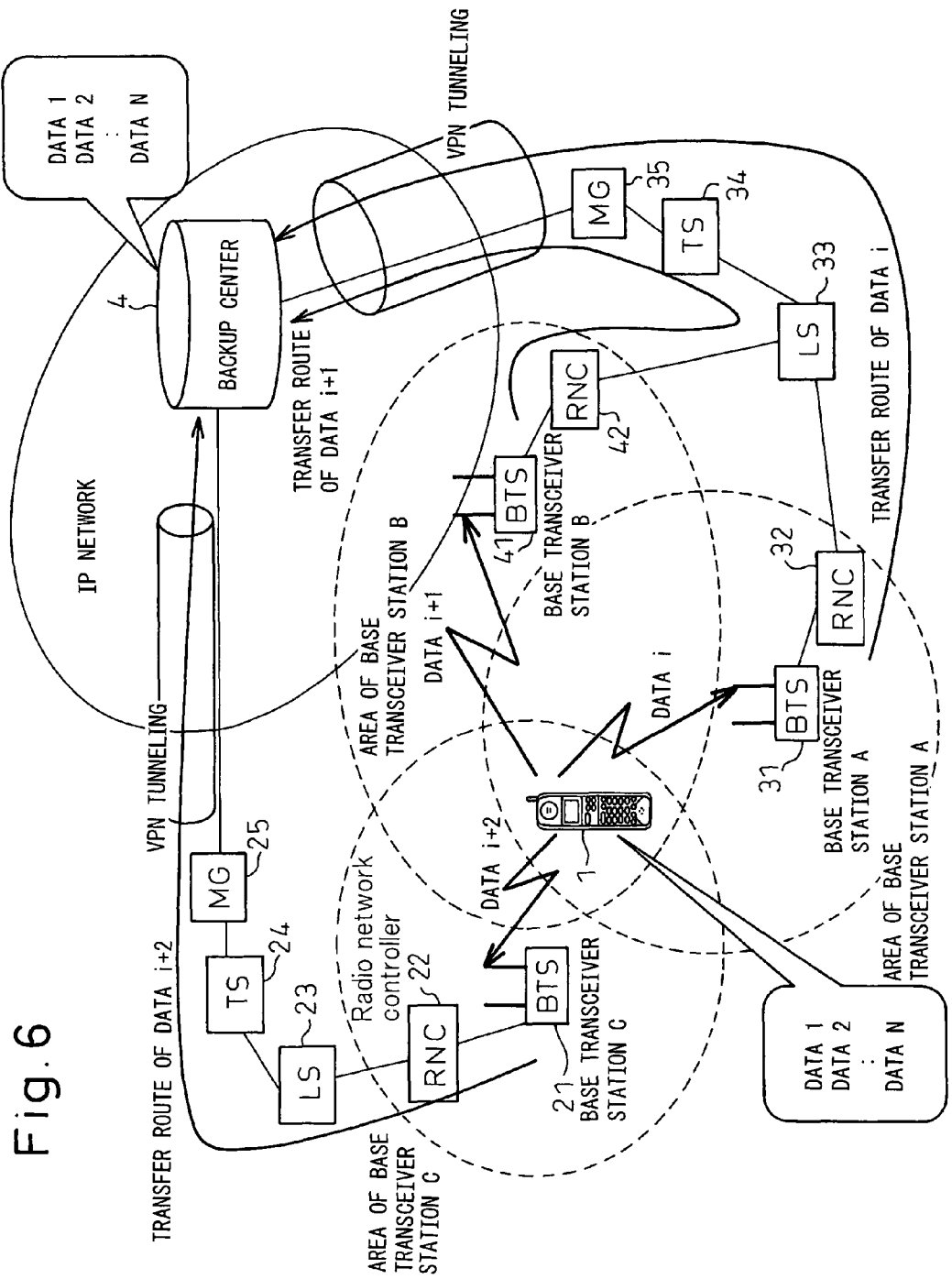
FIG. 6 is a diagram showing a third embodiment of the present invention.

FIG. 6 shows a third embodiment of the present invention. Further, FIG. 7 shows an example of a communication sequence using split communication paths.

In this example, in the process of transmitting the backup data (S108) of FIG. 3, there is schematically shown an operational example in which the data forwarding address change function 1-2, the data splitting function 1-3 and the data transfer function 1-4 of the cellular phone 1 transmit the data that is split into a plurality of paths, and an operational example, in which the data assembly function 4-4 of the backup center 4 assembles and restores the received data.

In FIG. 6, user A's lost cellular phone 1 receives radio waves from wireless base transceiver stations (BTS) 21, 31 and 41 in a plurality of areas. When the plurality of base transceiver stations 21, 31 and 41 that are communicatable are detected, the data forwarding address change function 1-2 cyclically switches between the communication paths of these base transceiver stations (data i, i+1, . . . , i+n).

The data splitting function 1-3 fragments the data (data 1, 2, . . . , N) according to the data priority of the service registration table 5 further into blocks suitable for transmitting to each transmission path. For example, the data N is fragmented into data fragments N-1, N-2, . . . , N-n and sequence numbers are given to each data fragment. The data transfer function 1-4 sequentially transmits the data fragments that are fragmented by the data splitting function 1-3 to the communication paths to the base transceiver stations 21, 31 and 41 that are cyclically switched by the data forwarding address change function 1-2 described above.

The data fragments on each communication path are transmitted to the backup center 4 through radio network controllers (RNC) 22, 32 and 42, local switches (LS) 23 and 33, toll switches (TS) 24 and 34, and media gateways (MG) 25 and 35, each of which corresponds to the respective one of the plurality of base transceiver stations (BTS).

As its primary function, the media gateways 25 and 35 convert the data format to that suitable for the IP network. Further, in this example, in order to improve data security, the VPN are provided between the media gateways 25 and 35 and the backup center 4. The VPN in different forms are selected depending on the location where the backup center 4 resides on networks. As an example, when the backup center 4 resides on a service network managed by a communication common carrier, a plurality of VPN routes are created by using IP-VPN or a wide-area Ethernet so that the VPNs can ensure security.

In contrast, when the backup center 4 is located on the Internet as a public service network, a plurality of VPN routes are created by using a SSL-VPN, IPsec-VPN, etc., so that the VPN can ensure security.

In the backup center 4, receiving data fragments from the plurality of different communication paths, the data assembly function 4-4 of the backup center 4 assembles the received data fragments to restore the original data (data 1, 2, . . . , N) based on the start data number and the end data number notified from the cellular phone 1 (see S108 in FIG. 3) and the sequence numbers provided when the data is split.

FIG. 7 shows a specific example of transmitted data on split paths and its VPN implementation.

In FIG. 7, a process for receiving the backup request with the data priority (A1, A2, . . . , An) from the backup center 4 (S201) is similar to the process in FIG. 3 (S107). In this example, the data A1 with the highest priority is split into N fragments (A1-1, A1-2, A1-3, . . . , A1-N) and cyclically transmitted to the respective communication paths to the plurality of base transceiver stations 21, 31 and 41. After data A1 has been transmitted completely, a next data split into N fragments (A2-1, A2-2, A2-3, . . . , A1-K) is transmitted similarly. After that, a similar process is performed until the data An with the lowest priority is transmitted.

Therefore, a third party who intercepts only one communication path cannot understand the contents of the transmitted data. The base transceiver stations 21, 31 and 41 receives the split data fragments and transmits them to the corresponding media gateways 25 and 35 via cellular phone networks. In this example, IP networks between the media gateways 25 and 35 and the backup center 4 are implemented as a VPN and the split data fragments are transmitted from the media gateways 25 and 35 to the backup center 4 through the VPN.

The data assembly function 4-4 of the backup center 4 restores the split data fragments received from the media gateways 25 and 35 as described above. In this connection, though the split data fragments are transmitted via the plurality of communication paths in this example, the transmission order of the split data fragments may be randomized so that the split data fragments can be transmitted on an identical communication path. In this case, the original data is restored based on the information owned by the backup center 4 about the transmission order of the split data fragments on the identical path, the normal data sequence numbers included in the packet data itself, etc.

What is claimed is:

1. A security system for a portable wireless terminal comprising:
   a portable wireless terminal; and
   a server apparatus that remotely controls the portable wireless terminal to transmit data from the portable wireless terminal to the server apparatus via a wireless network and stores the transmitted data as backup data,
   wherein the server apparatus comprises a table containing identification information of a communication terminal registered by an owner of the portable wireless terminal, authenticates the communication terminal accessing the server apparatus based on detection of a match with the identification information in the table and, in response to a request from the communication terminal authenticated successfully, controls the portable wireless terminal to transmit the data stored in the portable wireless terminal to the server apparatus, and the portable wireless terminal splits the data to be transmitted to the server apparatus into a plurality of data fragments and cyclically transmits the data fragments through a plurality of base transceiver stations to the server apparatus.

2. The security system according to claim 1, wherein the table further contains transmission priority information of the data to be transmitted,
   the server apparatus notifies the portable wireless terminal of the transmission priority information and, according to the notified transmission priority information, the portable wireless terminal transmits the data stored in the portable wireless terminal to the server apparatus.

3. The security system according to claim 1, wherein each of the plurality of communication paths is implemented as a VPN.

4. The security system according to claim 1, wherein the server apparatus notifies the portable wireless terminal of a public key and,
   the portable wireless terminal encrypts the data stored in the portable wireless terminal by the notified public key.

5. The security system according to claim 1, wherein, after the portable wireless terminal transmits the data stored in the portable wireless terminal to the server apparatus, the server apparatus instructs the portable wireless terminal to delete the data that has been transmitted.

6. The security system according to claim 1, wherein, before the portable wireless terminal transmits the data stored in the portable wireless terminal to the server apparatus, instructs the portable wireless terminal to perform a dial-lock process.

7. The security system according to claim 1, wherein the portable wireless terminal performs a wake-up process periodically at a predetermined time period to accept an instruction from the server apparatus to transmit the data stored in the portable wireless terminal to the server apparatus.

8. The portable wireless terminal according to claim 1, further including an encryption function section that implements each of the plurality of communication paths as a VPN.

9. A portable wireless terminal that transmits data to a server apparatus by remote control from the server apparatus via a wireless network, the portable wireless terminal comprising:
   a data access control section that, in response to an instruction from the server apparatus, prohibits access to the data stored in said portable wireless terminal or deletes the data; and
   an encryption function section that encrypts the data by using a public key notified from the server apparatus in response to the instruction from the server apparatus;
   a data transmission function section that splits the encrypted data to be transmitted to the server apparatus into a plurality of data fragments and cyclically transmits the data fragments through a plurality of base transceiver stations to the server apparatus.

10. The portable wireless terminal according to claim 9, wherein the data transmission section transmits the data to the server apparatus according to transmission priority of the data that is notified from the server apparatus or stored in the portable wireless terminal itself.

11. The portable wireless terminal according to claim 9, wherein the data access control section performs a wake-up process periodically at a predetermined time period to accept control by the server apparatus.

12. A security method for a portable wireless terminal comprising:

receiving by a server apparatus a request to back up the portable wireless terminal from the other communication terminal;

authenticating by the server apparatus the communication terminal based on detection of a match with the identification information registered by the owner of the portable wireless terminal in a table stored in the server apparatus;

controlling by the server apparatus the portable wireless terminal to transmit the data stored in the portable wireless terminal to the server apparatus if the communication terminal is authenticated successfully;

splitting by the portable wireless terminal the data to be transmitted to the server apparatus into a plurality of data fragments; and transmitting cyclically by the portable wireless terminal the data fragments through a plurality of base transmitter stations to the server apparatus.

* * * * *